United States Patent
Li et al.

(10) Patent No.: US 10,523,131 B2
(45) Date of Patent: Dec. 31, 2019

(54) RECONFIGURABLE MMC SUB-MODULE UNIT AND CONTROL UNIT THEREOF

(71) Applicants: NR ELECTRIC CO., LTD, Jiangsu (CN); NR ENGINEERING CO., LTD, Jiangsu (CN)

(72) Inventors: Gang Li, Jiangsu (CN); Jianchun Li, Jiangsu (CN); Jie Tian, Jiangsu (CN); Haiying Li, Jiangsu (CN); Yu Lu, Jaingsu (CN); Yunlong Dong, Jiangsu (CN); Zhaoqing Hu, Jiangsu (CN); Minglian Zhu, Jiangsu (CN)

(73) Assignees: NR ELECTRIC CO., LTD, Jiangsu (CN); NR ENGINEERING CO., LTD, Jiangsu (CN)

( * ) Notice: Subject to any disclaimer, the term of this patent is extended or adjusted under 35 U.S.C. 154(b) by 0 days.

(21) Appl. No.: 16/322,457

(22) PCT Filed: Aug. 2, 2017

(86) PCT No.: PCT/CN2017/095570
§ 371 (c)(1),
(2) Date: Jan. 31, 2019

(87) PCT Pub. No.: WO2018/024207
PCT Pub. Date: Feb. 8, 2018

(65) Prior Publication Data
US 2019/0173392 A1    Jun. 6, 2019

(30) Foreign Application Priority Data

Aug. 5, 2016    (CN) .......................... 2016 1 0640915

(51) Int. Cl.
*H02M 7/483*    (2007.01)
*H02M 7/487*    (2007.01)
*H02M 7/493*    (2007.01)
*H02M 1/00*    (2006.01)

(52) U.S. Cl.
CPC ........... *H02M 7/483* (2013.01); *H02M 7/493* (2013.01); *H02M 2001/0003* (2013.01); *H02M 2007/4835* (2013.01)

(58) Field of Classification Search
CPC ....... H02M 7/483; H02M 7/487; H02M 7/493
See application file for complete search history.

(56) References Cited

U.S. PATENT DOCUMENTS

2014/0002933 A1* 1/2014 Gao ........................ H02M 1/32
361/18
2014/0312828 A1* 10/2014 Vo ..................... H01M 10/4257
320/103

(Continued)

FOREIGN PATENT DOCUMENTS

CN    103746575 A    4/2014
CN    104022666 A    9/2014

(Continued)

OTHER PUBLICATIONS

ISA/CN, International Search Report dated Nov. 2, 2017 in International Application No. PCT/CN2017/095570, 4pages.

*Primary Examiner* — Gary L Laxton
*Assistant Examiner* — Sisay G Tiku
(74) *Attorney, Agent, or Firm* — Masuvalley & Partners (57) ABSTRACT

A reconfigurable MMC sub-module unit and a control unit thereof are provided, the reconfigurable MMC sub-module unit is mainly formed by an MMC sub-module unit and a reconfigurable mechanism, wherein the reconfigurable mechanism is formed by switches, and the conversion of MMC sub-module unit topology is achieved through switching on and off the switches in the reconfigurable mechanism. According to the reconfigurable MMC sub-module unit and the control unit thereof, the rapid change of a topology structure for a converter can be achieved, which is suitable for the demand of the line connection of the medium-voltage (Continued)

power distribution network and variable topologies, and meets requirements of dynamic simulation experiment for different converter topologies in the dynamic simulation experiment, thereby reducing construction costs and duration, improving experiment efficiency, and having high flexibility and strong versatility.

4 Claims, 5 Drawing Sheets

(56) References Cited

U.S. PATENT DOCUMENTS

| | | | |
|---|---|---|---|
| 2015/0333660 A1* | 11/2015 | Kim | H02M 1/32 363/123 |
| 2016/0036314 A1* | 2/2016 | Koyanagi | H02M 1/32 363/65 |
| 2017/0012521 A1* | 1/2017 | Jimichi | H02M 7/483 |
| 2017/0207631 A1* | 7/2017 | Helling | H02M 7/483 |
| 2018/0062291 A1* | 3/2018 | Gotz | H01R 12/721 |
| 2018/0159316 A1* | 6/2018 | Aramaki | H02H 7/12 |
| 2018/0183231 A1* | 6/2018 | Xie | H02H 7/12 |
| 2018/0205240 A1* | 7/2018 | Sadilek | H02J 7/345 |

FOREIGN PATENT DOCUMENTS

| | | |
|---|---|---|
| CN | 104426405 A | 3/2015 |
| CN | 106154086 A | 11/2016 |
| CN | 205982459 U | 2/2017 |
| EP | 2978092 A1 | 1/2016 |

\* cited by examiner

RECONFIGURABLE MMC SUB-MODULE UNIT AND CONTROL UNIT THEREOF

RELATED APPLICATIONS

This application is the U.S. National Phase of and claims priority to International Patent Application No. PCT/CN2017/095570, International Filing Date Aug. 2, 2017; which claims benefit of Chinese Patent Application No. 201610640915.8, filed Aug. 5, 2016; both of which are incorporated herein by reference in their entireties.

FIELD OF THE INVENTION

The invention belongs to the field of medium-voltage distribution network and dynamic simulation experiment, in particular to a reconfigurable MMC sub-module unit and a control unit thereof.

BACKGROUND OF THE INVENTION

The Modular Multilevel Converter (MMC) realizes high-voltage and large-capacity output by sequentially cascading several converter valve sub-module units in the same direction, without the need for direct series connection of switching devices, which avoids the requirement of uniform triggering for direct series connection of devices, and has many advantages such as low switching frequency, good expansibility, high quality of output voltage waveform and low operation loss, it is therefore widely used in flexible AC and DC transmission applications, and currently it has been widely used in power supply, back-to-back interconnection and large-scale renewable energy grid connection in island and urban load-intensive areas, and has broad prospects for development.

The MMC medium-voltage distribution network needs to realize DC fault isolation and fast recovery after a fault occurs, and the use of the converter valve topology with self-shutdown capability is an optimization scheme, but the converter valve topology scheme with self-shutdown capability leads to high loss of converter, so a hybrid topology scheme using half-bridge and full-bridge is a preferred solution. However, for this scheme, if half-bridge MMC sub-module is used partly and full-bridge MMC sub-module is used partly in a direct way, the commonality of sub-modules is not good and the sub-modules cannot be interchanged, it is therefore feasible to design a reconfigurable MMC sub-module unit without additional cost.

Meanwhile, the MMC dynamic model experiment system simulates the working state of modular multilevel converter to verify key technologies such as the actual engineering control protection strategy and the control strategy for the valve-based electronic control system, which is an important technical means to study modular multi-level converter at present.

The MMC sub-module unit topology commonly used in engineering comprises a half-bridge structure, a full-bridge structure, a quasi-full-bridge structure, etc. However, the currently constructed MMC dynamic simulation experiment platform generally has the disadvantages of single topology of dynamic simulation sub-module unit and not easy to adjust flexibly, which cannot realize the transformations of multiple topologies in one sub-module unit. When the topology of simulation sub-module unit changes, the requirements of dynamic simulation experiment cannot be met, and a new dynamic simulation experiment platform needs to be rebuilt. If a dynamic simulation experiment platform is built separately for different MMC sub-module topologies, the workload will be large and the construction cost will be high, and the MMC dynamic simulation experiment platform will be inefficient. Therefore, MMC dynamic simulation sub-module units with multiple typical topological switching capabilities are of great significance.

SUMMARY OF THE INVENTION

In view of the above technical problem, the technical problem to be solved by the present invention is to provide a reconfigurable MMC sub-module unit and a control unit thereof, which can satisfy the requirement of reconfigurable converter for different sub-module unit topologies in the medium-voltage distribution network and the MMC dynamic simulation experiment. Medium-voltage distribution network increases the commonality of sub-modules, dynamic simulation system reduces the construction cost and workload of MMC dynamic simulation test platform, improves the efficiency of test platform, and has high flexibility and versatility.

In order to achieve the above object, the solution of the present invention is described as follows:

A reconfigurable MMC sub-module unit is provided, the reconfigurable MMC sub-module unit is formed by an MMC sub-module unit and a reconfigurable mechanism, the reconfigurable mechanism is formed by various switches, and the reconfigurable mechanism is embedded to the MMC sub-module unit through electric connection lines or copper busbar, the topology of the MMC sub-module unit is converted by switching on or off change-over switches in the reconfigurable mechanism.

When a reconfigurable MMC subunit adopts a full-bridge sub-module with a bypass switch, the full-bridge sub-module is formed by four power semiconductor elements, a bypass switch, a voltage equalizing resistor and a capacitor, each power semiconductor comprises an anti-parallel diode, an emitter of a first power semiconductor element and a collector of a second power semiconductor element are connected to a upper end of the bypass switch, an emitter of a third power semiconductor element and a collector of a fourth power semiconductor element are connected to a lower end of the bypass switch, a collector of the first power semiconductor element and a collector of the third power semiconductor element are connected to a positive end of the capacitor, a emitter of the second power semiconductor element and a emitter of the fourth power semiconductor element are connected to a negative end of the capacitor, a upper end of the voltage equalizing resistor is connected to the positive end of the capacitor and the lower end of the voltage equalizing resistor is connected to the negative end of the capacitor. The reconfigurable sub-module unit comprises a reconfigurable mechanism formed by three change-over switches, one end of a first change-over switch is connected to the negative end of the capacitor of the full-bridge sub-module, the other end is connected to the lower end of the bypass switch and one end of a second change-over switch; one end of the second change-over switch is connected to the middle point of the bridge arm of the third power semiconductor element and the fourth power semiconductor element of the full-bridge sub-module, and the other end is connected to the bypass switch and one end of the first power semiconductor element; one end of the third change-over switch is connected to the collector of the first power semiconductor element of the full-bridge submodule, and the other end is connected to the collector of the third power semiconductor element of the full-bridge sub-module.

The reconfigurable mechanism of the reconfigurable MMC sub-module unit is formed by the first change-over switch, the second change-over switch and the third change-over switch, wherein the first change-over switch is connected in parallel to the negative end of the capacitor and a low-voltage outlet of the full-bridge sub-module, the second change-over switch is connected in series to the low-voltage outlet of the full-bridge sub-module, and the third change-over switch is connected in series to the collector of the first power semiconductor element and the collector of the third power semiconductor element of the full-bridge sub-module.

A reconfigurable sub-module unit is provided, the MMC sub-module unit may use a full-bridge sub-module or a quasi-full-bridge sub-module.

A control unit including a reconfigurable sub-module unit, a secondary control and protection unit is connected to control ends of power semiconductor elements, switching elements and change-over switches of conversion structures of the reconfigurable MMC sub-module, respectively; the switching on and off of the change-over switches are controlled by a control system to realize the change of topological structure of the sub-module unit.

A control unit including a reconfigurable sub-module unit is provided, by closing the first change-over switch S1, turning off the second change-over switch S2 and the third change-over switch S3 to form a half-bride submodule topology.

A control unit including a reconfigurable sub-module unit is provided, by closing the change-over switches S2, S3, and turning off the change-over switch S1 to form a full-bridge sub-module topology to form a full-bridge sub-module topology.

A control unit including a reconfigurable sub-module unit is provided, by closing the change-over switches S2, S3, turning off the change-over switch S1, and continuously sending a turn-on command to a third power device T3 transistor to form a quasi-full-bridge sub-module topology.

A control unit including a reconfigurable sub-module unit is provided, and a method of switching from full-bridge or quasi-full-bridge topology to half-bridge topology is to close the first change-over switch and open the second change-over switch and the third change-over switch at the same time.

A reconfigurable converter formed by the reconfigurable MMC unit is provided, the reconfigurable converter comprises several reconfigurable sub-module units, a first end of the MMC sub-module unit is defined as a leading-out end from midpoint of the bridge arm of the first power semiconductor element and the second power semiconductor element, and a second end of the reconfigurable MMC sub-module unit is defined as a leading-out end from a joint of the bypass switch, the first change-over switch and the second change-over switch, the first end of the reconfigurable MMC sub-module unit and the second end of adjacent MMC sub-module unit are sequentially cascaded in the same direction to form a MMC converter; by controlling the change-over switches of the reconfigurable sub-module in the converter, a half-bridge MMC converter, a full-bridge MMC converter, a quasi-full-bridge MMC converter, and a half-bridge and full-bridge hybrid MMC converter are formed.

A reconfigurable converter formed by the reconfigurable sub-module is provided, half-bridge MMC sub-module units formed by reconfigurable MMC sub-module change-over switches form the half-bridge MMC converter; full-bridge MMC sub-module units formed by reconfigurable MMC sub-module change-over switches form the full-bridge MMC converter; the quasi-full-bridge MMC converter is formed by quasi-full-bridge MMC sub-module units; the half-bridge and full-bridge hybrid MMC converter is formed by half-bridge and full-bridge MMC sub-module units formed by reconfigurable MMC sub-module change-over switches.

Compared with the prior art, the reconfigurable MMC sub-module unit of the present invention has the following beneficial effects: a converter valve sub-module unit can be switched between half-bridge, full-bridge and quasi-full-bridge topologies by the control of change-over switches and the switching on and off of power semiconductor elements, so as to meet the requirements of flexible topology transformation of MMC medium-voltage distribution network, to meet the requirements of loss reduction and fast recovery of medium-voltage distribution network, and to realize the unification of sub-modules. It also can meet the needs of dynamic simulation test for different sub-module topologies in dynamic simulation test, avoid duplicate construction cost of dynamic simulation, reduce the overall investment and workload of MMC dynamic simulation test platform, improve the efficiency of the test platform, and have high flexibility and versatility.

DETAILED DESCRIPTION OF THE EMBODIMENTS

The technical solutions and advantageous effects of the present invention will be described in detail below with reference to the accompanying drawings.

The invention provides a reconfigurable MMC sub-module unit, wherein a plurality of sub-module units may be sequentially cascaded in the same direction to form an MMC dynamic simulation converter to realize the switching between half-bridge, full-bridge and quasi-full-bridge topologies of a converter valve sub-module unit by means of the control of change-over switches and the switching on and off of power semiconductor elements in a reconfigurable mechanism, which satisfies the requirements of switching or testing for different sub-module unit topologies of MMC.

Figure 1:
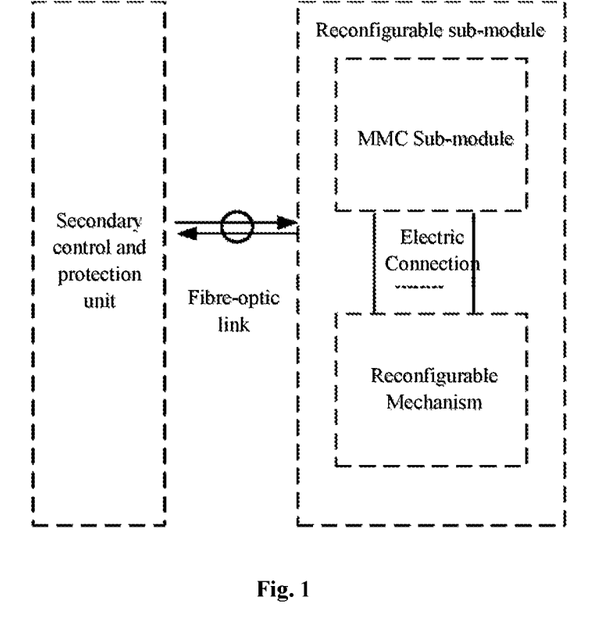
FIG. 1 is a schematic diagram of a reconfigurable sub-module unit and a control unit.

FIG. 1 shows a reconfigurable MMC sub-module unit and a control unit, which comprise an MMC sub-module unit and a reconfigurable mechanism, and the reconfigurable mechanism is formed by various switches, and the reconfigurable mechanism is embedded to the MMC sub-module unit through power connection lines or copper busbar, the control unit controls the switching on and off of the switches and semiconductor devices in the reconfigurable mechanism to realize the conversion of MMC sub-module unit topologies, which may run in different MMC topologies, including half-bridge, full-bridge and quasi-full-bridge topologies.

Figure 2:
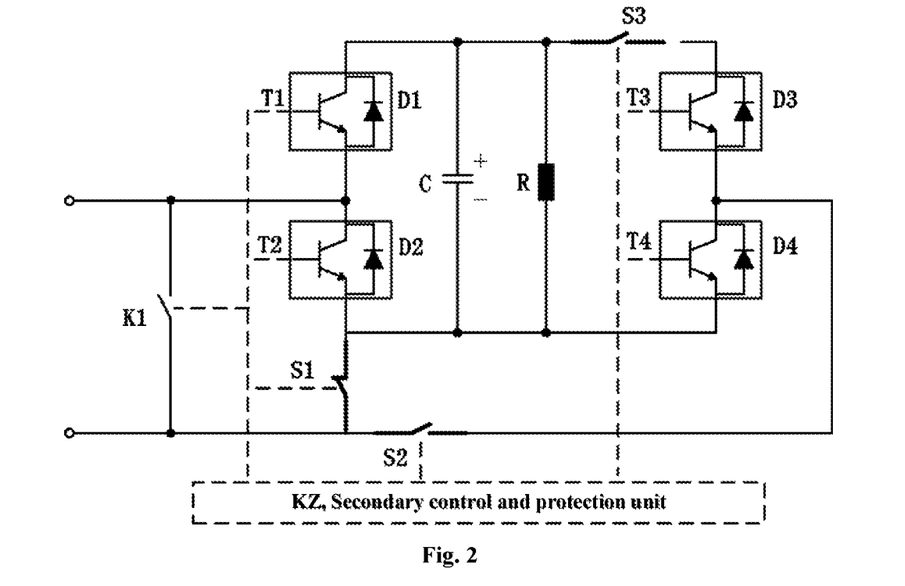
FIG. 2 is a full-bridge reconfigurable electrical diagram of the present invention.

As shown in FIG. 2, a reconfigurable MMC sub-module unit according to the present invention comprises a DC support capacitor C, a voltage equalizing resistor R, a first power semiconductor element T1, a second power semiconductor element T2, a third power semiconductor element T3, a fourth power semiconductor element T4, a first diode D1, a second diode D2, a third diode D3, a fourth diode D4, a bypass switch K1, a first change-over switch S1, a second change-over switch S2, a third change-over switch S3 and a secondary control and protection unit KZ, wherein the support capacitor C comprises a capacitor or at least two capacitors connected in parallel with each other, and the voltage equalizing resistor R and all the DC support capacitors are connected in parallel with each other.

The secondary control and protection unit KZ is coupled to control ends of four power semiconductor elements, three change-over switches, and the bypass switch, respectively.

The invention provides a reconfigurable MMC sub-module unit, which can realize the switching between half-bridge, full-bridge and quasi-full-bridge topologies of MMC sub-module unit by means of the control of change-over switches and the on-off of power semiconductor elements, to meet the needs of medium-voltage distribution network for different topological structures and rapid change thereof, and meet the needs of dynamic simulation experiment for different sub-module unit topologies in MMC dynamic simulation experiment.

The topology switching of the reconfigurable MMC sub-module unit of the present invention mainly comprises three typical structures: a half-bridge structure, a full-bridge structure, and a quasi-full-bridge structure. The technical solutions will be described in detail below in conjunction with the drawings and specific embodiments.

Embodiment 1: Half-Bridge Topology

Figure 3:
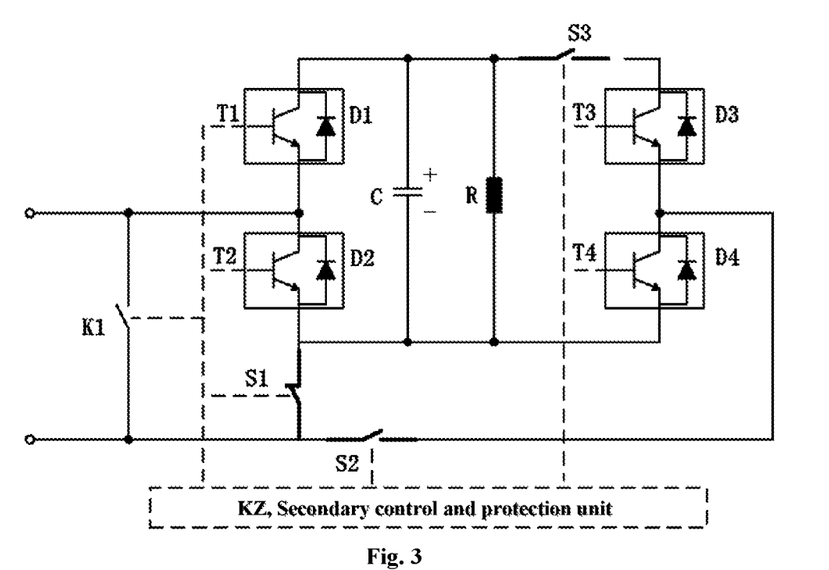
FIG. 3 is a schematic view of a reconfigurable half-bridge structure of the present invention.

As shown in FIG. 3, the first change-over switch S1 is closed, the second change-over switch S2 is turned off, and the third change-over switch S3 is turned off. At this time, the third power semiconductor element T3, the fourth power semiconductor element T4, the third diode D3 and the fourth diode D4 are not connected to the circuit, and the sub-module unit is a half-bridge topology.

Embodiment 2: Full-Bridge Topology

Figure 4:
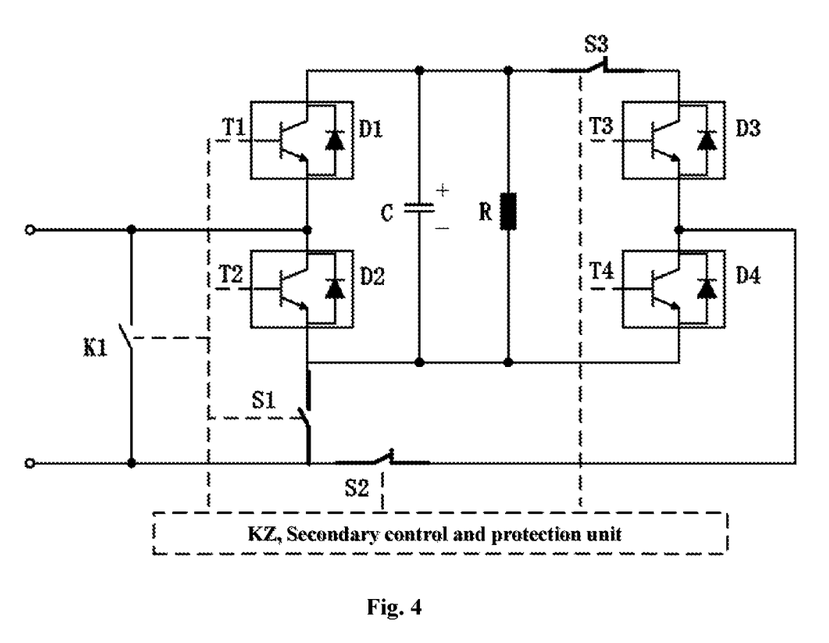
FIG. 4 is a schematic view of a reconfigurable full-bridge structure of the present invention.

As shown in FIG. 4, the first change-over switch S1 is turned off, the second change-over switch S2 is closed, and the third change-over switch S3 is closed. At this time, all elements are connected to the circuit, and the sub-module unit is a full-bridge topology.

Embodiment 3: Quasi-Full-Bridge Topology

Figure 5:
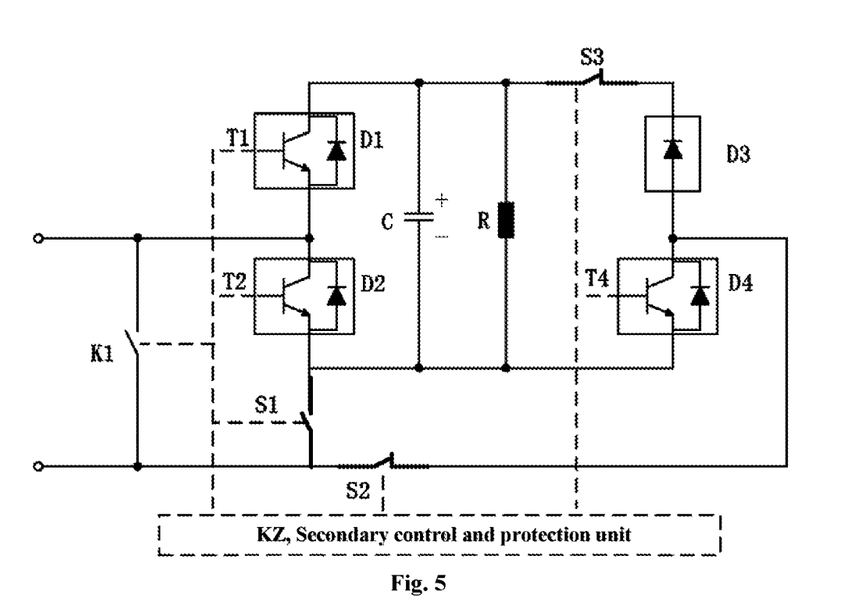
FIG. 5 is a schematic view of a reconfigurable quasi-full-bridge structure of the present invention.

As shown in FIG. 5, the first change-over switch S1 is turned off, the second change-over switch S2 is closed, and the third change-over switch S3 is closed. At this time, all elements are connected to the circuit, and during normal operation the third power semiconductor element T3 remains turned-off state without current flow, which can be defaulted from the circuit, only the third diode in anti-parallel flows current, the sub-module unit is a quasi-full-bridge topology.

Figure 6:
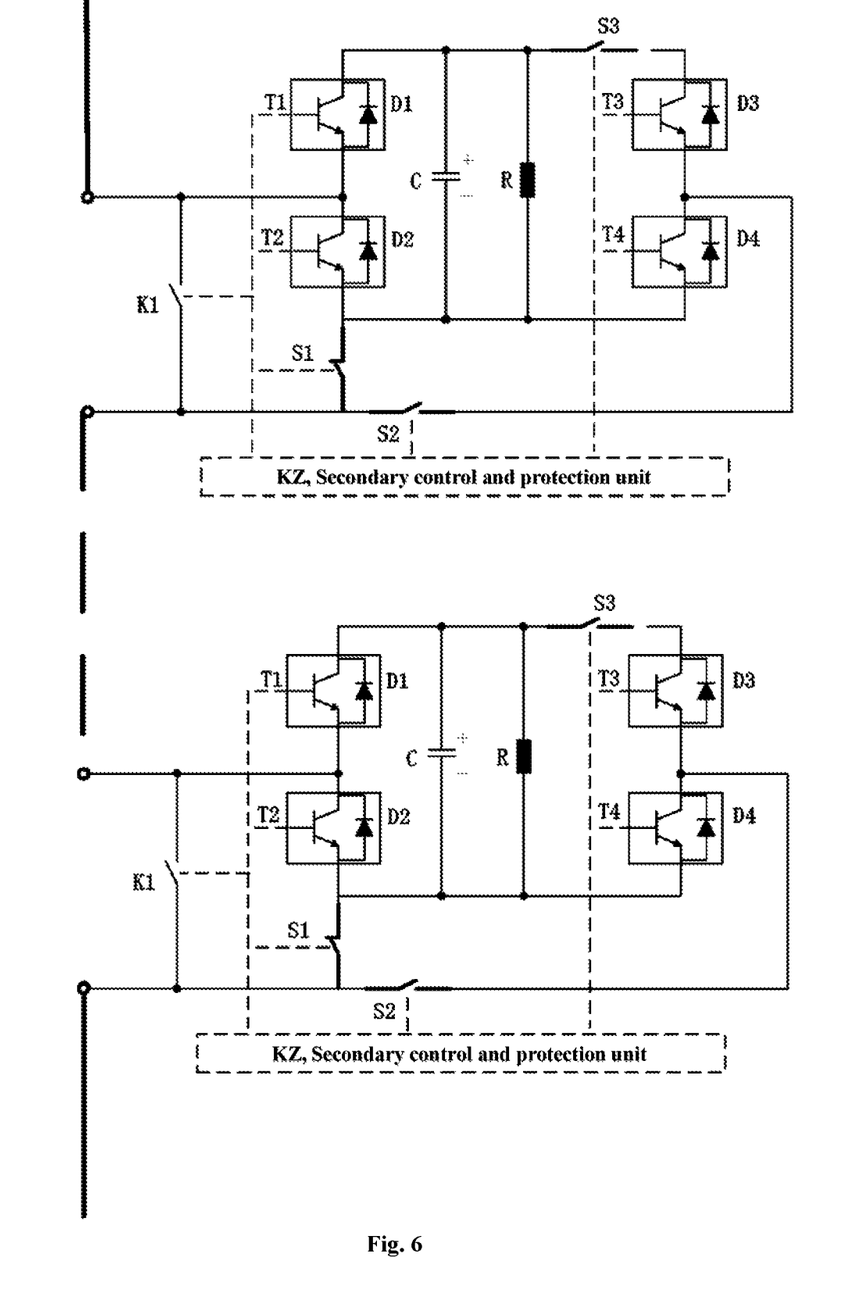
FIG. 6 is a schematic diagram of an MMC multilevel converter formed by reconfigurable sub-modules according to the present invention.

FIG. 6 shows a schematic diagram of a half-bridge modular multi-level converter formed by reconfigurable MMC sub-module units of the present invention, comprising a plurality of above-mentioned reconfigurable MMC sub-module units, a first end of the MMC dynamic simulation sub-module unit is defined as a leading-out end from a midpoint of the bridge arm of the first power semiconductor element T1 and the second power semiconductor element T2, and a joint of the bypass switch K1, the first change-over switch S1 and the second change-over switch S2 is defined as the second end of the reconfigurable MMC sub-module unit. The first end of the plurality of reconfigurable MMC sub-module units is sequentially cascaded with the second end of the adjacent reconfigurable sub-module unit in the same direction to form an MMC converter bridge arm, and six converter bridge arms form a reconfigurable MMC converter.

Figure 7:
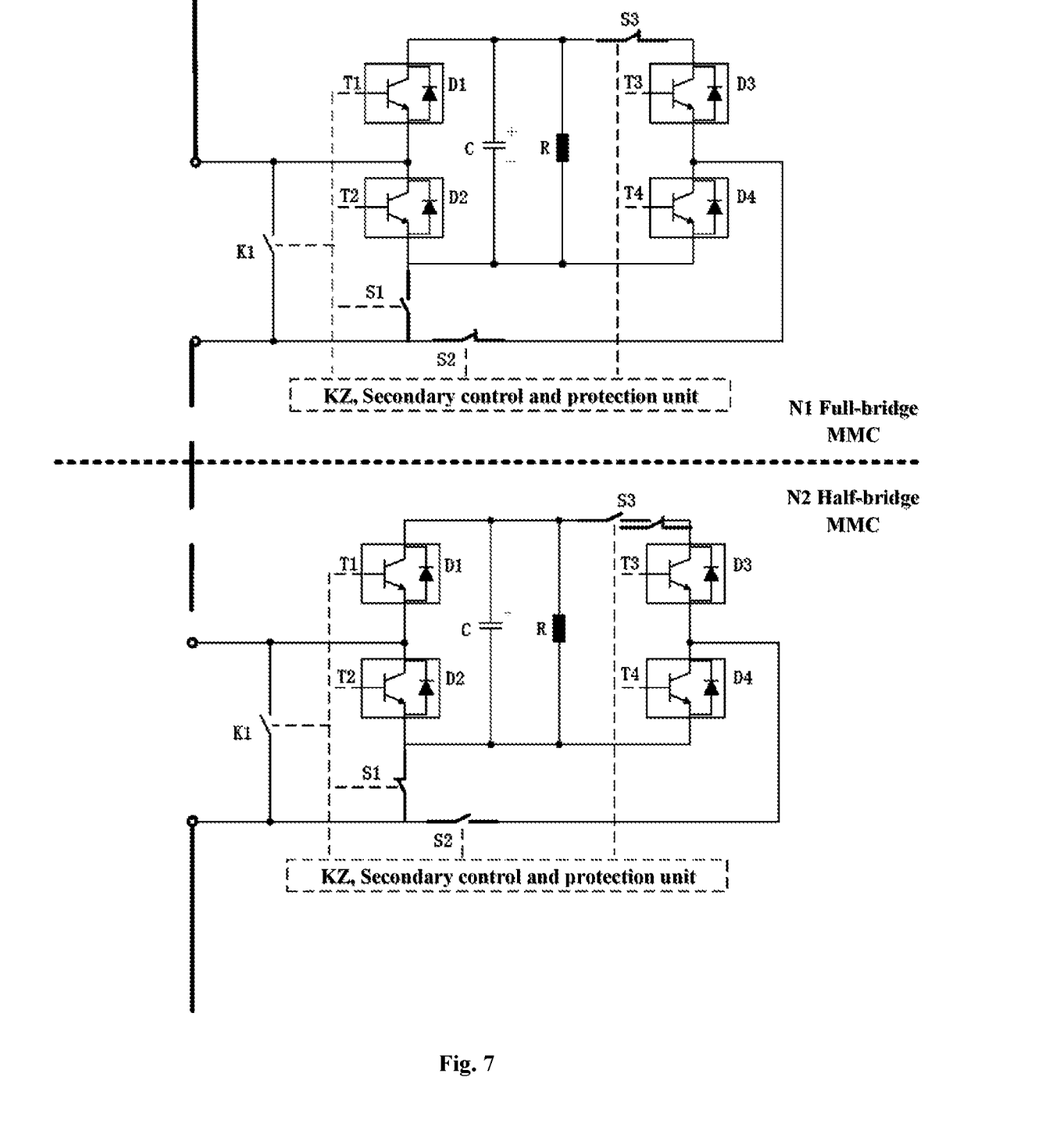
FIG. 7 is a schematic diagram of a half-bridge and full-bridge hybrid MMC multilevel converter formed by reconfigurable sub-modules according to the present invention.

FIG. 7 shows a schematic diagram of a half-bridge and a full-bridge hybrid multilevel converter constructed by using reconfigurable MMC sub-modules of the present invention, wherein each bridge arm is formed by N sub-modules, which are formed by N1 full-bridge sub-modules and N2 half-bridge sub-modules cascaded with each other. The number of full-bridge and half-bridge sub-modules is determined by specific project. Generally, the number of full-bridge sub-modules among them is no less than ⅓ of total number. In addition to the advantages of DC fault isolation and low loss, this kind of topology can also switch the sub-module topology quickly and realize the switch between different topology structures.

The embodiments of the present invention have been described in detail above with reference to the accompanying drawings, which are merely illustrative of the technical scope of the present invention. It should be understood by those skilled in the art that any modification or equivalent replacement of the specific embodiments of the invention without departing from the technical ideas and scope of the invention shall be covered within the scope of the claims of the invention.

The invention claimed is:

1. A reconfigurable modular multilevel converter (MMC) module, characterized in that:
   the reconfigurable MMC module comprises an MMC sub-module unit and a reconfigurable mechanism, the reconfigurable mechanism comprises change-over switches, the reconfigurable mechanism is embedded to the MMC sub-module unit through electric connection lines or copper busbar, and a topology of the MMC sub-module unit is converted by switching on or off the change-over switches in the reconfigurable mechanism;
   in a case of a full-bridge sub-module with a bypass switch, the reconfigurable mechanism in the reconfigurable MMC module is formed by three change-over switches;
   the full-bridge sub-module comprises four power semiconductor elements, the bypass switch, a voltage equalizing resistor and a capacitor, the power semiconductor elements each comprises an anti-parallel diode, an emitter of a first power semiconductor element and a collector of a second power semiconductor element are connected to an upper end of the bypass switch, an emitter of a third power semiconductor element and a collector of a fourth power semiconductor element are connected to a lower end of the bypass switch, a collector of the first power semiconductor element and a collector of the third power semiconductor element are connected to a positive end of the capacitor, an emitter of the second power semiconductor element and an emitter of the fourth power semiconductor element are connected to a negative end of the capacitor, an upper end of the voltage equalizing resistor is connected to the positive end of the capacitor and a lower end of the voltage equalizing resistor is connected to the negative end of the capacitor;

the reconfigurable mechanism is embedded to the full-bridge sub-module, one end of a first change-over switch is connected to the negative end of the capacitor of the full-bridge sub-module, another end of the first change-over switch is connected to the lower end of the bypass switch and one end of a second change-over switch; another end of the second change-over switch is connected to a middle point of a bridge arm of the third power semiconductor element and the fourth power semiconductor element of the full-bridge sub-module; one end of a third change-over switch is connected to the collector of the first power semiconductor element, the positive end of the capacitor and a negative end of the voltage equalizing resistor of the full-bridge sub-module, and another end of the third change-over switch is connected to the collector of the third power semiconductor element of the full-bridge sub-module.

2. The reconfigurable MMC module according to claim 1, characterized in that: the reconfigurable mechanism is formed by the first change-over switch, the second change-over switch and the third change-over switch, wherein the first change-over switch is connected in parallel to the negative end of the capacitor and a low-voltage outlet of the full-bridge sub-module, the second change-over switch is connected in series to the low-voltage outlet of the full-bridge sub-module, and the third change-over switch is connected in series to the collector of the first power semiconductor element and the collector of the third power semiconductor element of the full-bridge sub-module.

3. The control unit including the reconfigurable MMC module according to claim 1, characterized in that: the full-bridge sub-module topology is formed by closing the second change-over switch and the third change-over switch of the change-over switches, and turning off the first change-over switch of the change-over switches.

4. A reconfigurable converter formed by the reconfigurable MMC module according to claim 1, characterized in that: the reconfigurable converter comprises several reconfigurable MMC modules, a first end of the reconfigurable MMC module is defined as a leading-out end from a midpoint of a bridge arm of the first power semiconductor element and the second power semiconductor element of the reconfigurable MMC module, and a second end of the reconfigurable MMC module is defined as a leading-out end from a joint of the bypass switch, the first change-over switch and the second change-over switch of the reconfigurable MMC module, the several reconfigurable MMC modules are formed into a MMC converter by cascading the first end of the reconfigurable MMC module and the second end of an adjacent MMC module sequentially in the same direction; by controlling the change-over switches of the reconfigurable module in the converter, a half-bridge MMC converter, a full-bridge MMC converter, a quasi-full-bridge MMC converter, or a half-bridge and full-bridge hybrid MMC converter is formed.

* * * * *